(12) United States Patent
Beenken et al.

(10) Patent No.: US 9,211,605 B2
(45) Date of Patent: Dec. 15, 2015

(54) METHOD FOR JOINING A COMPOSITE SHEET TO A METALLIC SUBSTRATE

(71) Applicants: Heiko Beenken, Soest (DE); Peter Ohse, Duisburg (DE)

(72) Inventors: Heiko Beenken, Soest (DE); Peter Ohse, Duisburg (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 14/487,215

(22) Filed: Sep. 16, 2014

(65) Prior Publication Data
US 2015/0001004 A1 Jan. 1, 2015

Related U.S. Application Data

(63) Continuation of application No. PCT/EP2013/053774, filed on Feb. 26, 2013.

(30) Foreign Application Priority Data

Mar. 19, 2012 (DE) .......................... 10 2012 102 286

(51) Int. Cl.
*B23K 11/16* (2006.01)
*B23K 11/00* (2006.01)
*B21D 39/03* (2006.01)
*B23K 1/00* (2006.01)
(Continued)

(52) U.S. Cl.
CPC .............. *B23K 11/002* (2013.01); *B21D 39/03* (2013.01); *B23K 1/0008* (2013.01); *B23K 9/0026* (2013.01); *B23K 26/0093* (2013.01); *B32B 3/08* (2013.01); *B32B 3/266* (2013.01); *B32B 9/042* (2013.01); *B32B 15/043* (2013.01); *B32B 15/08* (2013.01); *B32B 15/18* (2013.01); *B32B 15/20* (2013.01); *B23K 2203/16* (2013.01); *B32B 2307/102* (2013.01); *Y10T 29/49732* (2015.01); *Y10T 428/24322* (2015.01)

(58) Field of Classification Search
CPC ........ G10K 11/161; B23K 31/02; B23K 9/23; B23K 11/16
USPC ......................................................... 181/296
See application file for complete search history.

(56) References Cited

U.S. PATENT DOCUMENTS 3,095,951 A 7/1963 Rood et al.

FOREIGN PATENT DOCUMENTS

CN 101192656 A 6/2008
CN 101653861 A 2/2010
(Continued)

*Primary Examiner* — Forrest M Phillips
(74) *Attorney, Agent, or Firm* — Reinhart Boerner Van Deuren P.C.

(57) ABSTRACT

The invention relates to a method for joining a composite sheet to a metallic substrate, wherein the composite sheet has at least one metallic top layer and at least one non-metallic layer which consists of a plastic material, wherein an opening is introduced into the composite sheet, and wherein at least one joining element is provided which is inserted into the opening of the composite sheet. A method for joining a composite sheet to a metallic substrate with process reliability and of specifying a corresponding structure is achieved by forming the joining element as a metallic sleeve, wherein the metallic sleeve is deformed, so that it joins together with the composite sheet in a form-fit and force-fit manner, and wherein the metallic sleeve is firmly bonded to the substrate with the end pointing towards the substrate using a filler material, wherein the filler material is arranged inside the sleeve.

18 Claims, 2 Drawing Sheets

(51) Int. Cl.
*B23K 9/00* (2006.01)
*B23K 26/00* (2014.01)
*B32B 3/26* (2006.01)
*B32B 9/04* (2006.01)
*B32B 15/04* (2006.01)
*B32B 15/08* (2006.01)
*B32B 15/18* (2006.01)
*B32B 15/20* (2006.01)
*B32B 3/08* (2006.01)

(56) References Cited

FOREIGN PATENT DOCUMENTS

| | | |
|---|---|---|
| DE | 101 09 112 A1 | 9/2002 |
| DE | 10 2010 044 886 A1 | 5/2011 |
| DE | 10 2010 061 502 A1 | 1/2012 |
| JP | S57 127 581 A | 8/1982 |
| JP | 01005678 A | 1/1989 |

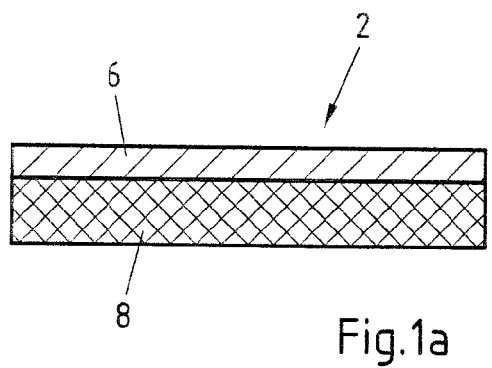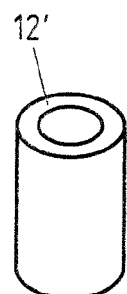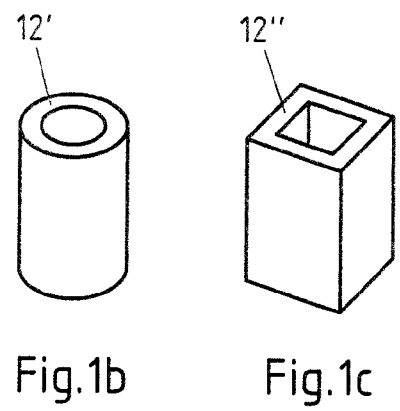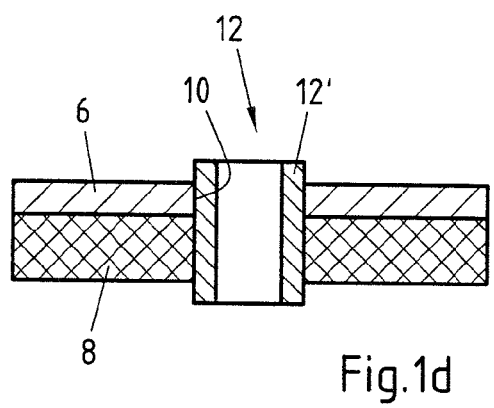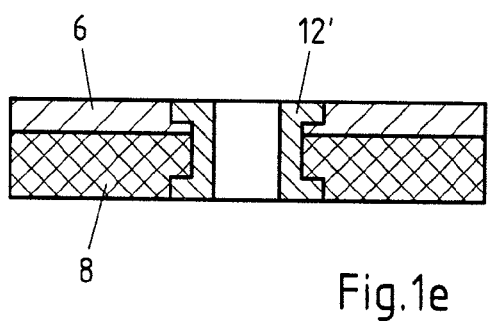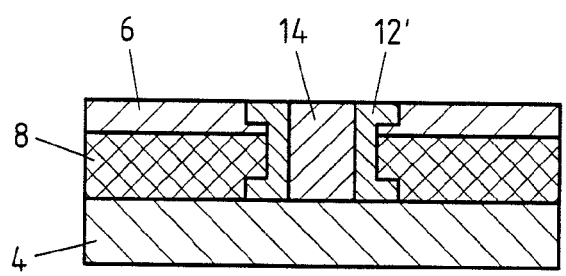

METHOD FOR JOINING A COMPOSITE SHEET TO A METALLIC SUBSTRATE

CROSS-REFERENCE TO RELATED PATENT APPLICATIONS

This patent application is a continuation of PCT/EP2013/053774, filed Feb. 26, 2013, which claims priority to German Application No. 10 2012 102 286.0, filed Mar. 19, 2012, the entire teachings and disclosure of which are incorporated herein by reference thereto.

BACKGROUND OF THE INVENTION

The invention relates to a method for joining a composite sheet to a metallic substrate, wherein the composite sheet has at least one metallic top layer and at least one non-metallic layer which consists of a plastic material, wherein an opening is introduced into the composite sheet, and wherein at least one joining element is provided which is inserted into the opening of the composite sheet. In addition, the invention relates to a structure, in particular produced using an embodiment of the above mentioned method, comprising a composite sheet and a substrate, wherein the composite sheet has at least one metallic top layer and at least one non-metallic layer which consists of a plastic material, wherein at least one joining element is arranged in the composite sheet.

Composite sheets, also called damping sheets, which have at least one metallic top layer and a non-metallic layer, usually a plastic layer, are increasingly being used in automotive engineering due to their high flexural rigidity and their vibration-damping properties. A large reduction in weight can be achieved in particular in vehicle body construction by using composite sheets.

Durably joining composite sheets to a substrate is known from the prior art, for example from JP 01005678 A. JP 01005678 A relates to a method for arc welding a damping sheet, which has a plastic resin layer between two metallic layers, to a substrate, wherein an opening is introduced into the substrate and into the metal layer of the damping sheet pointing to the substrate. The damping sheet is joined to the substrate along the opening by arc welding. The plastic resin layer in the process passes into the gas phase. The disadvantage of welding processes of this type is that the plastic material has an indirect effect on the welding process and hence results in an unstable arc.

Taking this as the starting point, the invention is based on the object of specifying a generic method for joining a composite sheet to a metallic substrate with process reliability and of specifying a corresponding structure, so that the disadvantages from the prior art are avoided.

SUMMARY OF THE INVENTION

This object is achieved according to a first teaching by forming the joining element as a metallic sleeve, deforming the metallic sleeve, so that it joins together with the composite sheet in a form-fit and force-fit manner, and firmly bonding the metallic sleeve to the substrate with the end pointing towards the substrate using a filler material, wherein the filler material is arranged inside the sleeve.

By forming the joining element as a sleeve, the plastic layer of the composite sheet is separated from the joining area, so that it does not affect the subsequent joining process. By joining the sleeve to the composite sheet in a form-fit and force-fit manner, a durable connection between the sleeve and the composite sheet is ensured, so that when the sleeve is subsequently joined to the substrate the composite sheet is also durably joined to the substrate. By joining the sleeve to the substrate using a filler material, which is arranged inside the sleeve, the composite sheet can be durably joined to the substrate without the plastic layer of the composite sheet affecting the joining process. As a result, a better join is achieved between the composite sheet and the substrate. In addition, the joining process can take place without the plastic layer being damaged by a too high input of heat. The sleeve is deformed, for example, by pressing. Subsequently, on the open side of the composite sheet, the sleeve can either protrude or be flush with the surface of the composite sheet.

This method additionally has the advantage that it is particularly simple in design and in execution, since the welding point is particularly easy to reach through the channel of the sleeve.

According to a first advantageous embodiment of the method according to the invention, the process of joining the sleeve to the substrate can be effected by arc welding, laser welding, resistance welding, arc brazing, laser brazing or resistance brazing. However, other common joining processes are also conceivable.

In one preferred embodiment, the filler material at least partly fills up the interior of the sleeve. Increased stability with respect to the join between the sleeve and the substrate is hereby ensured. In addition, in this way the stability in the plane of the composite sheet can also be improved. Of course, the filler material can also fill up the interior of the sleeve completely and further improve the stability. A welding consumable, for example of a welding electrode, but also any other common welding consumable or a brazing material can be provided as the filler material. Of course, for other joining processes other filler materials are also conceivable.

Particularly preferably, the sleeve in the deformed state at least on the side pointing towards the substrate is flush with the surface of the composite sheet, so that the composite sheet lies directly on the substrate and can be joined to it.

According to one particularly preferred simple embodiment, the sleeve has the shape of a hollow cylinder with a circular cross-sectional area. However any other cross-sectional area, for example a quadrangular or polygonal or an elliptical area is also conceivable. In the deformed state the longitudinal extension of the sleeve can be greater than the thickness of the composite sheet. By, for example, pressing the sleeve into an H-shape the sleeve is subsequently at least partly flush with the surface of the composite sheet. The H-shape ensures that there is a form-fit and force-fit join between the sleeve and the composite sheet. Forces in the plane of the composite sheet and forces perpendicular to the surface of the light sheet can hereby be absorbed by the sleeve.

Preferably, the composite sheet has a further metallic layer which is joined to the plastic layer. The embodiment of the composite sheet is referred to as a sandwich sheet and has particularly high soundproofing and vibration-damping properties with high mechanical strength.

According to a further embodiment, the at least one metallic top layer of the composite sheet and/or the sleeve and/or the substrate consist of steel, aluminium and/or an aluminium alloy. By using these metallic top layers a positive effect can be achieved both in relation to the weight and the cost of the composite sheet. This list is not, of course, exclusive and any other common metallic compound, for example magnesium, can be used as the material for the above mentioned components.

According to a further embodiment, plastic materials are used which can be exposed to higher temperature variations over a certain period of time without changing their properties. Preferably, for vehicle construction plastic layers are used which are suitable for coating in a dipping bath, in particular for cathodic dip painting.

The insertion of the sleeve can take place in a single-step process using a self-cutting sleeve, but alternatively it can also take place in a multi-step process by punching the composite sheet with a tool and subsequently inserting the sleeve.

In a further embodiment, a plurality of sleeves can be inserted in an opening of the composite sheet in each case. The bonding surface of the join between the composite sheet and the substrate can hereby be further increased.

Preferably, the thickness of the plastic layer of the composite sheet is greater than the thickness of the at least one metallic top layer, whereby a large saving in weight can be obtained.

According to a second teaching of the present invention, the above disclosed object is achieved by a joined structure comprising a composite sheet and a substrate, by the joining element being formed as a metallic sleeve, the metallic sleeve being joined to the composite sheet in a form-fit and force-fit manner and the sleeve being firmly bonded to the substrate with the end pointing towards the substrate using a filler material, wherein the filler material is arranged inside the sleeve.

As already explained above, the sleeve isolates the plastic layer of the composite sheet, so that the plastic layer neither affects the joining process nor is it damaged by an input of heat by the joining process. By joining the sleeve to the composite sheet in a form-fit and force-fit manner and by firmly bonding the sleeve to the substrate, a particularly firm join between the composite sheet and the substrate can be ensured.

According to a further embodiment of the structure, the filler material at least partly fills up the sleeve. A better join is hereby ensured between the sleeve and the substrate, on the one hand, but also the stability in the plane of the composite sheet is increased. The filler material can, of course, also fill up the interior of the sleeve completely, whereby the stability can be further improved.

The join is particularly preferably formed by arc welding, laser welding, resistance welding, arc brazing, resistance brazing or laser brazing. This list is not exclusive and, of course, other common joining processes are also conceivable. A welding consumable or a brazing material can be provided as the filler material in accordance with the joining process. Of course, if other joining processes are used the use of other filler materials is also conceivable.

According to a subsequent embodiment of the structure according to the invention, the sleeve at least on the side pointing towards the substrate is flush with the surface of the composite sheet. The composite sheet can hereby lie directly on the substrate, whereby improved stability of the join is obtained in a direction perpendicular to the plane of the composite sheet.

Preferably, the sleeve at least partly forms a plane with the surface of the composite sheet. As a result of the fact that the sleeve is at least partly flush with the surface of the composite sheet, on the one hand, the stability of the join between the sleeve and the composite sheet can be improved in the direction of the plane of the composite sheet. Furthermore, this embodiment is particularly suitable for subsequent processing, since no protruding parts of the sleeve, which hamper subsequent processing, have to be removed from the surface of the composite sheet.

In one particularly preferred embodiment of the structure according to the invention, the composite sheet has at least one further metallic layer which is joined to the plastic layer. The arrangement of a plastic layer between two metallic top layers is, as described above, referred to as a sandwich sheet. This embodiment of the joined structure consequently has particularly high soundproofing and vibration-damping properties with a high mechanical strength.

The at least one metallic top layer of the composite sheet and/or the sleeve and/or the substrate preferably consist of steel, aluminium or an aluminium alloy, magnesium or a magnesium alloy. Both the cost and the weight of the structure according to the invention can be further reduced by using one of these materials for the above mentioned components (light sheet).

According to a final embodiment of the structure according to the invention, the thickness of the plastic layer of the composite sheet is greater than the thickness of the at least one metallic top layer. A further reduction in the weight of the joined structure can hereby be obtained.

Finally, the above disclosed object is achieved by the use of a structure according to the invention for subsequent sound absorption or for repair purposes.

The use of a structure according to the invention for subsequent sound insulation makes cost-efficient and effective vibration damping possible, wherein a firm join can be ensured between the vibrating component and the damping sheet.

BRIEF DESCRIPTION OF THE DRAWINGS

The invention shall be explained in more detail below by means of exemplary embodiments in conjunction with the drawings. In the drawings:

FIGS. 1a to 1f show an exemplary embodiment of the method according to the invention in schematic sectional views and schematic perspective views.

DETAILED DESCRIPTION OF THE INVENTION

Figure 2:
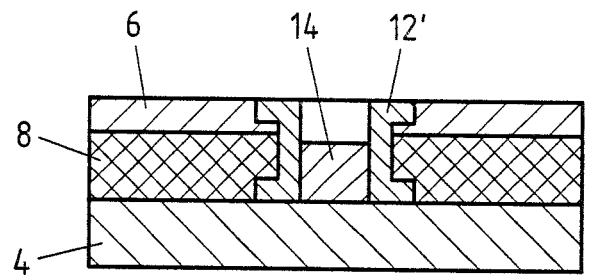
FIG. 2 shows an exemplary embodiment of a joined structure according to the invention.

FIGS. 1a to 1f respectively show individual steps of an exemplary embodiment of the method according to the invention. Specifically, FIG. 1a shows an exemplary embodiment of a composite sheet 2 which has a plastic layer 8 and a metallic top layer 6. The thickness of the plastic layer 8 is greater than the thickness of the metallic top layer 6 in the exemplary embodiment shown. It can, however, also be thinner. On the one hand, a large saving in weight can be obtained, but, in addition, the vibration-damping properties of the composite sheet 2 can also be improved.

FIGS. 1b and 1c show two exemplary embodiments of the sleeve 12' which is inserted as a joining element 12 into the composite sheet 2. Both exemplary embodiments have the form of a hollow body. The cross-sectional area of the sleeve 12' is round in FIG. 1b and the cross-sectional area of the sleeve 12" in FIG. 1c is quadrangular. Of course, a sleeve 12' with any other cross-sectional area, for example a polygonal cross-sectional area, can also be used, preferably, however, cylindrical sleeves are used.

FIG. 1d, in a schematic sectional view, shows a composite sheet 2 with an opening 10, wherein a joining element 12, in particular a sleeve 12', has been inserted into the opening 10. The insertion of the sleeve 12' can take place in a single-step process using a self-cutting sleeve 12', 12" as well as in a two-step process by punching the composite sheet 2 with a tool and subsequently inserting the sleeve 12', 12". The sleeve 12' preferably has the form of a hollow body, wherein the cross-sectional area can be both round and polygonal. In the illustrated exemplary embodiment, the longitudinal extension of the sleeve 12' is greater than the thickness of the composite sheet 2, so that by deforming it in a corresponding manner a form-fit and force-fit join can be ensured between the sleeve 12' and the composite sheet 2. The ends of the sleeve 12' are crimped in the process.

FIG. 1e shows an exemplary embodiment of the join between a deformed sleeve 12' and a composite sheet 2. By deforming the sleeve 12', for example by pressing, into an H-shape a form-fit and force-fit join can be obtained between the sleeve 12'and the composite sheet 2. The sleeve 12' can absorb forces in the plane of the composite sheet 2 and forces perpendicular to the surface of the composite sheet 2.

FIG. 1f shows an exemplary embodiment of a joined structure according to the invention comprising a composite sheet 2 and a substrate 4. The joining process is carried out using a filler material 14 which is arranged inside the sleeve 12'. In the illustrated embodiment, according to the invention the sleeve 12' is joined to the substrate 4. The filler material 14 fills up the interior of the sleeve 12' completely. This arrangement ensures additional stability in the plane of the composite sheet 2.

FIG. 2 shows an alternative exemplary embodiment of the joined structure according to the invention. The composite sheet 2 comprises a plastic layer 8 and a metallic top layer 6 corresponding to FIG. 1f. In contrast to FIG. 1f, the filler material 14 for joining the sleeve 12' to the substrate 4 only partly fills up the interior of the sleeve 12'. This arrangement ensures a saving in filler material compared to the exemplary embodiment of FIG. 1f.

Figure 3:
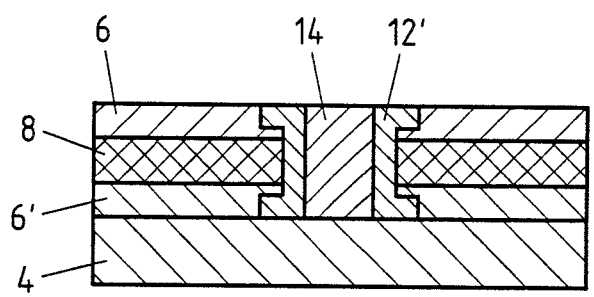
FIG. 3 shows a further exemplary embodiment of a joined structure according to the invention in a schematic sectional view.

FIG. 3 shows a further preferred exemplary embodiment of the structure according to the invention. In the illustrated exemplary embodiment, the composite sheet 2 comprises a plastic layer 8 together with two metallic top layers 6, 6'. This preferred exemplary embodiment has particularly high vibration-damping and soundproofing properties.

The invention claimed is:

1. Method for joining a composite sheet to a metallic substrate, wherein the composite sheet has at least one metallic top layer and at least one non-metallic layer which consists of a plastic material, comprising the steps of introducing an opening into the composite sheet, and providing at least one joining element which is inserted into the opening of the composite sheet and wherein:
   the joining element is formed as a metallic sleeve,
   the metallic sleeve is deformed, so that it joins together with the composite sheet in a form-fit and force-fit manner,
   the metallic sleeve is firmly bonded to the substrate with the end pointing towards the substrate using a filler material, wherein the filler material is arranged inside the sleeve.

2. Method according to claim 1, wherein the joint between the sleeve and the substrate is effected by arc welding, laser welding, resistance welding, arc brazing, resistance brazing or laser brazing.

3. Method according to claim 1, wherein the filler material at least partly fills up the sleeve.

4. Method according to claim 1, wherein the sleeve at least on a side pointing towards the substrate in a deformed state is flush with the surface of the composite sheet.

5. Method according to claim 1, wherein
   the sleeve has a cylindrical shape,
   a longitudinal extension of the sleeve is greater than a thickness of the composite sheet and
   the sleeve is pressed into an H-shape, so that it at least partly forms a plane with the surface of the composite sheet.

6. Method according to claim 1, wherein the composite sheet has at least one further metallic layer which is joined to the plastic layer.

7. Method according to claim 1, wherein the at least one metallic top layer of the composite sheet and/or the sleeve and/or the substrate consist of steel, aluminium and/or an aluminium alloy, magnesium or a magnesium alloy.

8. Method according to claim 1, wherein the opening is inserted into the composite sheet using a self-cutting sleeve.

9. Method according to claim 1, wherein a thickness of the plastic layer of the composite sheet is greater than a thickness of the at least one metallic top layer.

10. Structure produced using a method according to claim 1, comprising a composite sheet and a substrate, wherein the composite sheet has at least one metallic top layer and at least one non-metallic layer which consists of a plastic material, wherein at least one joining element is arranged in the composite sheet, wherein
    the joining element is formed as a metallic sleeve,
    the metallic sleeve is joined to the composite sheet in a form-fit and force-fit manner,
    the sleeve is firmly bonded to the substrate with the end pointing towards the substrate using a filler material, wherein the filler material is arranged inside the sleeve.

11. Structure according to claim 10, wherein the filler material at least partly fills up the sleeve.

12. Structure according to claim 10, wherein the joint is formed by arc welding, laser welding, resistance welding, arc brazing, resistance brazing or laser brazing.

13. Structure according to claim 10, wherein the sleeve at least on the side pointing towards the substrate is flush with the surface of the composite sheet.

14. Structure according to claim 10, wherein the sleeve at least partly forms a plane with the surface of the composite sheet.

15. Structure according to claim 10, wherein the composite sheet has at least one further metallic layer which is joined to the plastic layer.

16. Structure according to claim 10, wherein the at least one metallic top layer of the composite sheet and/or the sleeve and/or the substrate consist of steel, aluminium and/or an aluminium alloy, magnesium or a magnesium alloy.

17. Structure according to claim 10, wherein the thickness of the plastic layer of the composite sheet is greater than the thickness of the at least one metallic top layer.

18. A method of using the structure according to claim 10, comprising the step of using the structure for subsequent sound absorption or for repair purposes.

* * * * *